United States Patent [19]

Grodski et al.

[11] Patent Number: 4,964,061

[45] Date of Patent: Oct. 16, 1990

[54] MYOELECTRIC CONTROL OF ACTUATORS

[75] Inventors: Juliusz J. Grodski, Toronto; Guy B. Immega; Peter D. Lawrence, both of Vancouver, all of Canada

[73] Assignee: Her Majesty the Queen in right of Canada, as represented by the Minister of National Defence, Ontario, Canada

[21] Appl. No.: 375,453

[22] Filed: Jul. 5, 1989

[30] Foreign Application Priority Data

Jul. 11, 1988 [CA] Canada .................. 571707

[51] Int. Cl.$^5$ ............................................. A61F 1/06
[52] U.S. Cl. ...................................... 364/513; 623/25
[58] Field of Search .................. 364/513; 623/24–26; 414/4, 5; 901/5

[56] References Cited

U.S. PATENT DOCUMENTS

| | | | |
|---|---|---|---|
| 3,535,711 | 10/1970 | Fick | 901/33 |
| 4,158,196 | 6/1979 | Crawford, Jr. | 623/24 |
| 4,302,138 | 11/1981 | Zarudiansky | 901/33 |
| 4,314,379 | 2/1982 | Tanie et al. | 623/25 |
| 4,421,336 | 12/1983 | Petrofsky et al. | 623/24 |
| 4,521,924 | 6/1985 | Jacobsen et al. | 623/20 |
| 4,623,354 | 11/1986 | Childress et al. | 623/25 |
| 4,650,492 | 3/1987 | Barkhordar et al. | 623/24 |
| 4,655,673 | 4/1987 | Hawkes | 901/33 |
| 4,733,603 | 3/1988 | Kukdj | 92/153 |
| 4,831,531 | 5/1989 | Adams et al. | 414/5 |

Primary Examiner—Allen MacDonald
Attorney, Agent, or Firm—Nixon & Vanderhye

[57] ABSTRACT

It is the purpose of this invention to provide a method and apparatus for a compliance control in each degree of freedom of a robotic system independently of other control parameters. This independent compliance control capability allows dexterous assembly operations to be done without elaborate fixture of a work piece. The method of controlling compliance and position of an actuator comprises the steps of acquiring a raw Myoelectric signal from the muscles of a teleoperator, processing the raw Myoelectric signal into compliance control and position control signals and applying the control signal to an actuator(s) of the teleoperated robotic system.

7 Claims, 3 Drawing Sheets

MYOELECTRIC CONTROL OF ACTUATORS

The invention relates to a method and an apparatus for compliance and position control of a teleoperated robotic system. This application discloses the use of Myoelectric signals to control compliance of a robotic system.

Teleoperated robotic systems may be used to handle toxic material, maneuvers in space, underwater searches or tactical military maneuvers. For example a teleoperated robot arm may be used to hold a tool in a radiation filled environment since a human subject would be exposed to the danger of working in such an environment. Thus the teleoperator must be able to control the position and compliance of the robot arm from a remote location.

It is known in present day technology that actuators are used to control the joints in a robotic system. Hydraulic or pneumatic cylinders, or electrical motors constitute the standard actuating technology used in the current generation of robotic systems. Known robotic systems using these types of actuators are basically non-compliant. Two principal techniques have been used to alleviate this deficiency. Compliance can be built into a robotic system by permitting spring-like bending of some elements in the system. However, springs are passive components, and they oscillate when excited, adding to the difficulty of controlling the position of a robotic arm. One approach would be to dynamically vary the control in anticipation of the oscillations of the spring. Another approach is to generate an active "pseudo-compliance" in the control software of the robotic system. Proximity sensing and a feedback control loop are needed to achieve the "compliant" behavior from actuators which are themselves noncompliant. However, compliance capabilities achieved with these techniques are limited. They do not enable an arm to accommodate impulse loads nor touch a work surface with varying pressures and attitudes.

It is the purpose of this invention to provide an independent compliance control in each degree of freedom of the robotic system. This independent compliance control capability allows dexterous assembly operations to be done without elaborate fixture of a workpiece.

A method of controlling compliance and position of an actuator in each degree of freedom of a teleoperated robotic system is disclosed. The method comprises the steps of acquiring a raw myoelectric signal from the muscles of a teleoperator; processing the raw myoelectric signal into a compliance control signal; and applying the control signal to an actuator. Although any type of actuator will function satisfactorily it is preferable to use an actuator having characteristics that are analagous to human muscle characteristics. An actuator which has human muscle like characteristics is disclosed in U.S. Pat. No. 4,733,603.

A brief description of the attached drawings will aid in understanding the preferred embodiment of the invention. In the drawings.

A myoelectric signal is derived from the depolarization of contracting individual muscle fibres. Each muscle fibre is surrounded by a membrane semipermeable to certain ions. In the resting condition, the intracellular region is electrically negative with respect to the extracellular fluid. When stimulated, the fibre becomes permeable to ions which rapidly move into the interior, causing potential reversal across the fibre or its "depolarization". This is followed by a "repolarization" whereby the resting potential condition is restored. The process of depolarization and repolarization is associated with a momentary mechanical contraction of the muscle fibres. It can be repeated but only after a certain resting period.

One nerve fibre controls an assembly of muscle fibres, and together they constitute a motor unit. Muscle fibres of one motor unit are activated almost simultaneously, giving rise to a complex electrical potential transient in the nearby extracellular fluid. A muscle encompasses numerous motor units acting asynchronously. A myoelectric signal measured on the skin surface reflects the cumulative effect of all muscle-fibre action potentials in the proximity of the electrodes. The observed electrical signal is strongly related to the muscle contraction and, consequently, to the number of motor units and their rate of activation. Most of the energy of the resulting waveform lies in a frequency range between 30 and 200 Hz and the peak-to-peak amplitude may range up to several milivolts, when measured with electrodes on the skin. An instantaneous amplitude of the signal is not useful for control purposes. However, "raw" signals can be averaged and processed to represent the "amount" of the myoelectric signal that is subject to conscious voluntary control.

Figure 1:
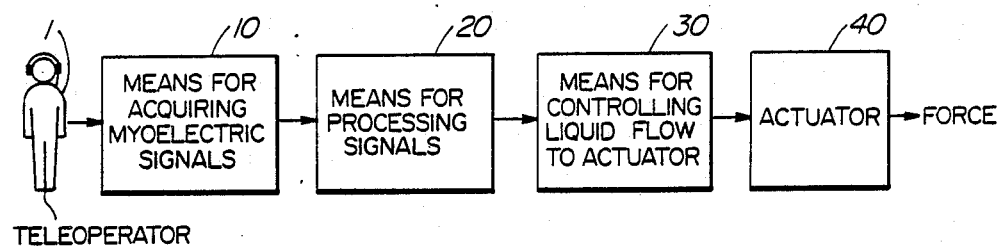
FIG. 1 is a block diagram illustrating an embodiment of the invention.

Referring now to FIG. 1 which shows a block diagram of the invention, myoelectric signals are acquired from a teleoperator 1, by a means 10 for acquiring said myoelectric signal. Electrodes may be used to acquire the myoelectric signal. This signal is then processed by a processing means 20 and the output from the processing means 20 is used to control fluid flow in means 30 to the actuator 40. The actuator 40 supplies a force signal to the system depending upon the amount of fluid received from the actuator.

Figure 2:
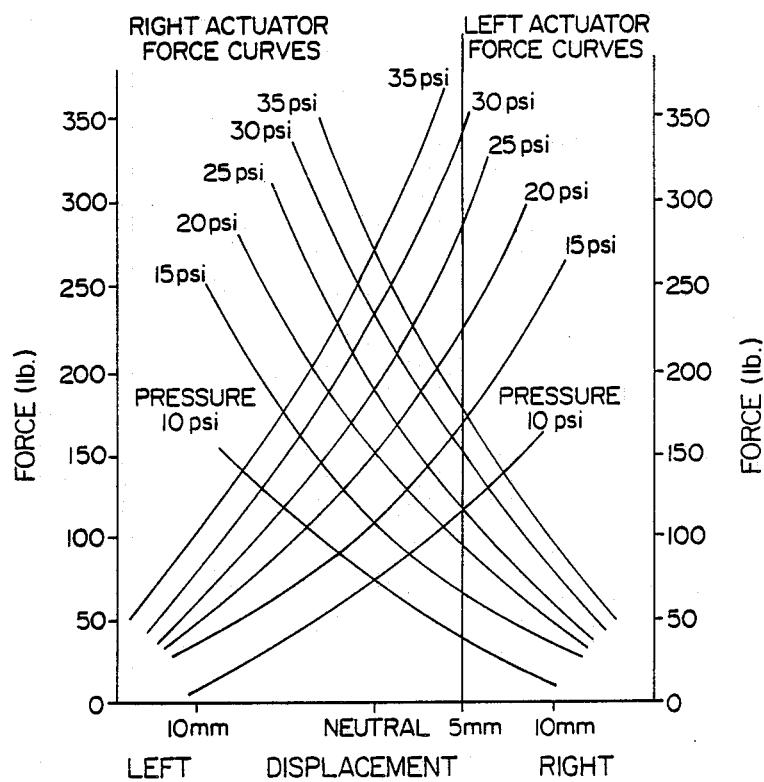
FIG. 2 shows an example of force versus displacement family of curves for an antagostic pair of actuators.

As shown in FIG. 2, the position of the arm can be controlled by the ratio of pressures acting upon a pair of antagonistic actuators. In this embodiment of the invention a pair of actuators is supplied with position and compliance control signals. For example, a right displacement of 5 mm is obtained with 25 psi pressure in the right actuator and 10 psi in the left actuator. The same displacement can be achieved with other combinations of pressures in the two actuators, (as demonstrated by intersection of the vertical line with other pressure curves in FIG. 2). When pressures in both actuators are increased while maintaining a constant pressure ratio, the angular position of the arm is maintained, but its stiffness increases, i.e., its compliance decreases. Consequently, compliance of actuator proportional control system can be dynamically varied according to the absolute actuator pressures, independently of the joint angle.

Figure 3:
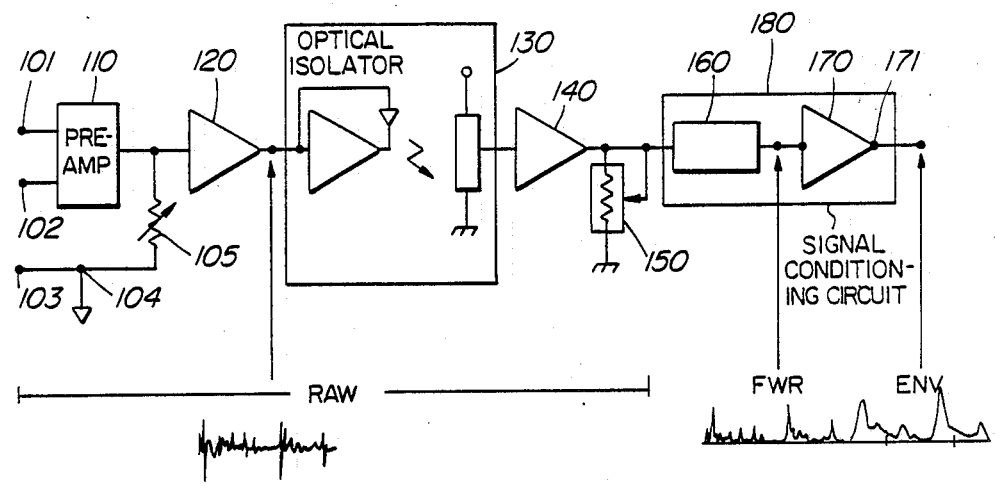
FIG. 3 illustrates in detail a preferred means for processing the myoelectric signals.

One possible processing means used to process the myoelectric signal acquired from the teleoperator is illustrated in FIG. 3. Myoelectric signals are picked up by a pair of electrodes 101 and 102. A reference electrode 103 is connected to an isolated ground at point 104. The outputs of the two electrodes 101 and 102 are input into a preamplifier stage 110. The signal from the reference electrode 103 is fed through an amplification control means 105. The output of the preamplification stage 100 and the output from the amplification control means 105 is input into a buffer preamplifier 120. The output of the buffer preamplifier 120 is input into an optical isolation circuit 130 as shown in FIG. 3. The purpose of the optical isolation circuit 130 is to prevent the teleoperator from receiving a shock from the processing means 100. The output from the optical isolation circuit 130 is input into an amplifier buffer 140 the output of which is input into an attenuation control means 150. The output from the attenuation control means 150 is input into a signal conditioning circuit means 180 for rectifying, integrating and averaging the signal. The resulting output signal is the envelope of the myoelectric signal input from electrodes 101 and 102. As illustrated in FIG. 1 the output signal from the myoelectric processor is supplied to the means 30 for controlling the liquid flowing to the actuator 40.

Figure 4:
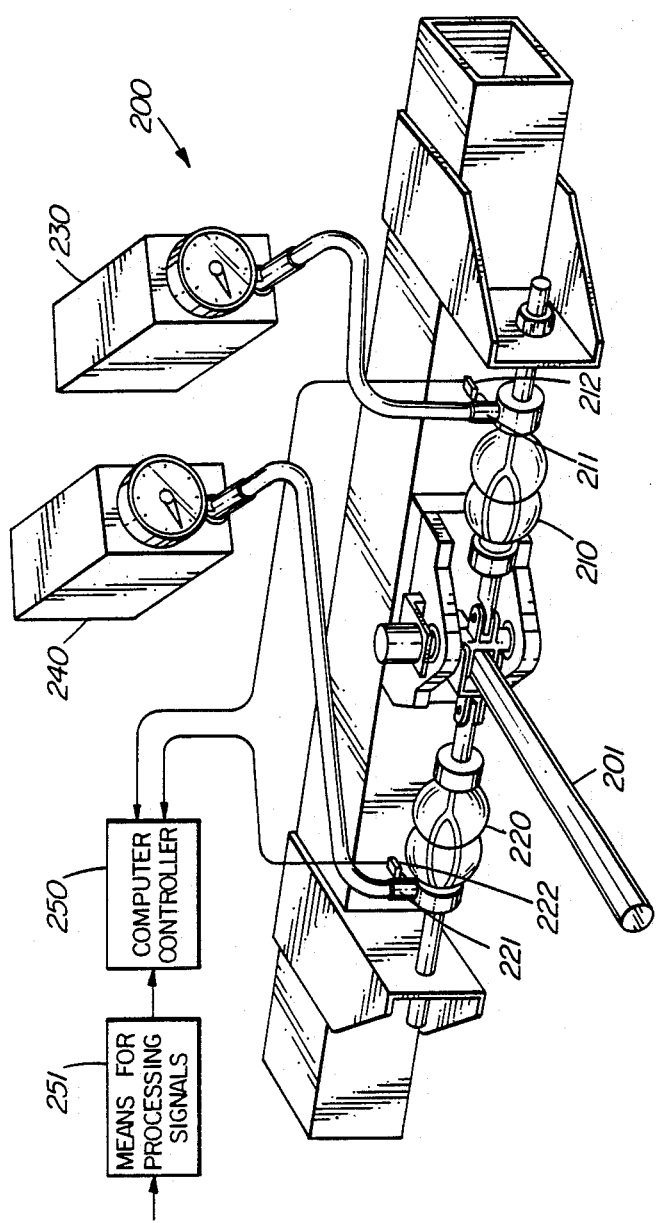
FIG. 4 illustrates one embodiment of the invention.

One embodiment of the invention is illustrated in FIG. 4. One single joint 201 is controlled by two actuators 210 and 220. Although the single joint 201 is shown to be controlled by two actuators, any number of actuators may be used to control the single joint. The total number of actuators in a robotic system will be a function of the number of joints in a robotic system.

A computer controller 250 receives an input from processing means 251 for processing myoelectric signals from the teleoperator and an input from pressure transducers 212 and 222. The actual pressure measured in the actuators 210 and 220 by the transducer 212 and 222 and the signal received from processing means 251 are compared by the computer controller 250. The outputs of the computer controller 250 are supplied to the servovalves 230 and 240. The output from the computer controller is a control signal which is a pressure error signal multiplied by a proportional gain. The computer controller 250 can be for example, a 16-bit 32020 microprocessor although any general purpose microprocessor will work.

The servovalves 230 and 240 control the amount of fluid that is passed through to the actuators 210 and 220. If the actuators 210 and 220 are operated by air flow then the servovalves 230 and 240 are pneumatic and if the actuators 210 and 220 are operated by flow of liquid then the servovalves 230 and 240 are hydraulic. The amount of fluid (gas/liquid) delivered to the actuators 210 and 220 controls the amount of force output from the actuators. As illustrated in FIG. 2 the position and compliance of a robotic system is controlled by the amount of fluid pressure in the actuator.

Figure 5:
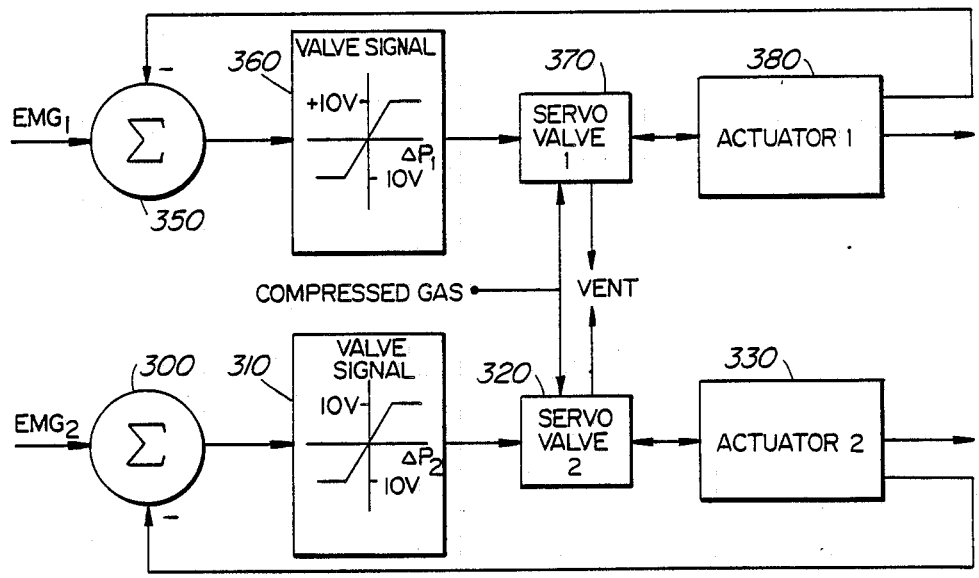
FIG. 5 illustrates a schematic diagram of the embodiment of the invention illustrated in FIG. 4.

FIG. 5 is a block diagram illustrating the signal flow of the embodiment of the invention as illustrated in FIG. 4.

The use of myoelectric signals for controlling the position and compliance of an actuator offers particularly significant advantages in telerobotic operations. The teleoperation of compliance, by means of myoelectric signals provides a dynamic and intuitive control of joint stiffness by human operator, thus permitting a teleoperated robot to undertake impulse dominated tasks in unstructured environments.

Although the invention has been illustrated in terms of a specific embodiment other processing means, means for acquiring the myoelectric signals, and means for providing the actuators with liquid flow may be used without departing from the spirit and scope of the invention.

We claim:

1. A method of controlling compliance of a teleoperated robotic system, said method comprising the steps of:
    acquiring raw myoelectric signals from the muscles of a telecoperator;
    processing said electric signals into first and second compliance control signals; and
    applying said first and second compliance control signals to first and second actuators respectively each of which provides a joint of said robotic system with a force signal relative to said compliance control signal.

2. The method of claim 1, wherein said processing includes the steps of:
    processing said myoelectric signals into envelopes of said signals; and
    controlling an amount of fluid that flows into each of said actuators.

3. The method of claim 1, wherein said actuators are antagonistic.

4. A compliance control system for a teleoperated robotic system, comprising:
    electrodes means for acquiring a myoelectric signal from a teleoperator;
    first and second signal processing means for processing said myoelectric signals received from said electrodes means into compliance control signals; and
    first and second servovalves having an input from said first and second signal processing means respectively for controlling fluid flow supplied to first and second actuators respectively;
    said actuators having an output relative to said fluid flow supplied by said first and second servovalves.

5. The compliance control system of claim 4, wherein each of said first and second signals processing means comprises means for providing an envelope of a rectified myoelectric signals, and a computer controller having an input from said means for providing an envelope of said rectified myoelectric signal and pressure sensing means secured to said actuator and having an output control signal to said servovalve.

6. The control compliance system of claim 5, wherein said means for providing an envelope of said rectified myoelectric signal further comprises amplifier/average means for receiving said myoelectric signal; and buffer amplifier connected to said amplifier/averager means; an optical isolator for preventing said teleoperator from receiving a shot; an attenuation control receiving an input from said optical isolator; and rectifier for rectifying the output from said attenuation control ; and integrator for integrating the output from said rectifier and an averager for averaging said output from said integrator.

7. The compliance control system of claim 4, wherein said actuators are antagonistic.

* * * * *